Patented Feb. 12, 1929.

1,702,168

UNITED STATES PATENT OFFICE.

WARREN MOORE, OF MEDIA, PENNSYLVANIA.

FUMIGANT.

No Drawing. Application filed February 3, 1926. Serial No. 85,811.

My invention relates to fumigants which will completely counteract disagreeable odors as well as have an insecticidal action.

One object of my invention is to provide a fumigant which will counteract or mask disagreeable odors as well as kill flies and other insects.

Another object is to provide a fumigant which will function in cold weather as satisfactorily as it does in warm weather, and which will be uniformly volatilized regardless of the weather.

A further object is to provide a fumigant which will chemically neutralize the acid fumes at the same time counteracting or masking disagreeable organic odors.

Various organic compounds have been suggested for use as deodorants or insecticides among which are camphor, naphthalene and paradichlorbenzol. The action of any one of these is greatly reduced in cold weather due to the low rate of volatilization of the compound in the cold. If mixtures of organic compounds are used, the mass will not be consumed uniformly for the components have different rates of volatilization. This nonuniform volatility causes the mass to flake off and to pit.

I have found that if a compound which engenders ammonia either per se or by reaction with an added compound, which forms besides the ammonia an inert unobjectionable residue, is added to a volatile organic solid a product results with new and unexpected properties. These properties render the new composition of matter of especial value as a fumigant. The evolution of ammonia gas from the mass produces a superficial porosity which exposes a greater surface of the material than has heretofore been possible, therefore rendering volatilization more rapid at low temperatures. On the other hand at higher temperature, the organic compounds retard the evolution of ammonia by the cloaking action. Hence we have a fumigant which will effectively act at all temperatures to be encountered.

A further and very material advantage accompanying the use of the ammonia engendering compound resides in its ability to neutralize acid fumes. For this reason, my fumigant is especially adapted for use in garbage pails where acid fumes are invariably found.

The use of my fumigant in connection with garbage performs three functions—the counteraction of disagreeable odors by the organic deodorant, the neutralization of acid fumes by the ammonium compound, and the insecticidal action of the organic deodorant and the ammonia. Heretofore, chloride of lime and carbolic acid as well as creoline and creosote have been used in garbage pails. These have the obvious disadvantage of contaminating the garbage, rendering it unfit for subsequent feeding to hogs, etc. One method of use of my compound is to suspend it in the form of a cake or block from the lid of the pail, thus precluding the possibility of contamination of the garbage with the ingredients of the fumigant.

The ammonia engendering compounds that may be used are of wide variety and may be either inorganic or organic. Of the former class, any ammonium salt is applicable, among which are ammonium carbonate (carbamate), ammonium bicarbonate, and ammonium sulphate.

Throughout the specification and claims, the terms, ammonium carbonate and ammonium carbamate, are used synonymously, since in commerce no distinction is made and since they function in the same manner.

If a salt of the type of ammonium sulphate is used, alkaline material such as sodium, potassium or calcium hydroxide increases the effectiveness of the mass, due in all probability to its reaction with the ammonium salt liberating ammonia gas.

I have found that hydrated lime used in connection with ammonium carbonate prevents the mass from becoming moist. The ammonium bicarbonate which is formed from the neutralization tends to absorb moisture but in the presence of lime, calcium carbonate is formed and thus absorption of moisture is prevented.

I have found that paradichlorbenzol acts especially satisfactorily as the organic deodorant but naphthalene, camphor and any other solid volatile compound may be used to advantage, as well as mixtures of two or more compounds.

The following formula and method of making the fumigant has proved to be satisfactory, 4 parts of paradichlorbenzol are melted with .5 parts of naphthalene and to this is added 1 part hydrated lime (calcium hydroxide), and 1 part of ammonium carbonate or carbamate. The mixture is poured into a suitable mold which may be placed in cold water to aid in rapid solidification. One of the functions of the naphthalene in this mixture is to reduce the melting point of the paradichlorbenzol so that the ammonium carbonate or carbamate when added will not decompose. Camphor might be used in place of the naphthalene.

This presence of ammonium carbonate in the paradichlorbenzol increases its effective volatilization so that it will function in cold weather. The paradichlorbenzol tends to preserve the ammonium carbonate, greatly reducing its decomposition. The lime, as heretofore pointed out, combines with the ammonium bicarbonate formed in the reaction and gives a product which will not become pasty due to its absorption of moisture. This molded fumigant is suspended and the fumes coming in contact with the vapors of the fumigant are completely counteracted and neutralized and therefore rendered non-obnoxious.

Obviously, also, a product containing the essential ingredients of the fumigant may be obtained by other processes, and the invention is not to be limited to any particular process of manufacture. Nor is there any limitation in the proportions of these ingredients in the product, since these may be largely varied to suit the particular work for which the fumigant is intended.

I claim:

1. A fumigant in block form comprising a solid inorganic ammonium compound and hydrated lime dispersed in a crystallized block of paradichlorbenzol, the solid inorganic ammonium compound and the paradichlorbenzol being in such a physical relationship that the liberation of one is controlled by the other, the ammonium compound increasing the volatilization of the paradichlorbenzol by increasing the surface thereof and the paradichlorbenzol retarding the evolution of ammonia gas by a cloaking action.

2. A fumigant in block form comprising ammonium carbonate dispersed in a crystallized block of paradichlorbenzol, the ammonium carbonate and the paradichlorbenzol being in such a physical relationship that the liberation of the one is controlled by the other, the ammonium carbonate increasing the volatilization of the paradichlorbenzol by increasing the surface thereof and the paradichlorbenzol retarding the evolution of the ammonia gas by a cloaking action.

3. A fumigant in block form comprising a solid inorganic ammonium compound and hydrated lime dispersed in a crystallized block of paradichlorbenzol containing another organic deodorant capable of lowering the melting point of the paradichlorbenzol, the solid inorganic ammonium compound and the paradichlorbenzol being such a physical relationship that the liberation of one is controlled by the other, the ammonium compound increasing the volatilization of the paradichlorbenzol by increasing the surface thereof and the paradichlorbenzol retarding the evolution of ammonia gas by a cloaking action.

4. A fumigant in block form comprising ammonium carbonate dispersed in a crystallized block of paradichlorbenzol containing naphthalene, the ammonium carbonate and the paradichlorbenzol being in such a physical relationship that the liberation of the one is controlled by the other, the ammonium carbonate increasing the volatilization of the paradichlorbenzol by increasing the surface thereof and the paradichlorbenzol retarding the evolution of the ammonia gas by a cloaking action.

WARREN MOORE.